United States Patent [19]
White-Stevens

[11] Patent Number: 5,437,800
[45] Date of Patent: Aug. 1, 1995

[54] METHOD OF PROCESSING A SIDESTREAM WITH A HYDROCYCLONE

[75] Inventor: Derek T. White-Stevens, Fairview, Tex.

[73] Assignee: Atlantic Richfield Company, Los Angeles, Calif.

[21] Appl. No.: 140,931

[22] Filed: Oct. 25, 1993

[51] Int. Cl.⁶ .................... B01D 11/60; B01D 21/26
[52] U.S. Cl. .................... 210/787; 210/512.2; 210/787; 210/805; 210/294; 422/256; 268/313
[58] Field of Search ................... 210/175, 512.1, 512.2, 210/774, 787, 788, 805, 294; 422/256; 208/313

[56] References Cited

U.S. PATENT DOCUMENTS

| | | | |
|---|---|---|---|
| 4,161,428 | 7/1979 | Gottschlich et al. | 210/805 |
| 4,783,272 | 11/1988 | Patterson | 210/512.2 |
| 5,076,930 | 12/1991 | Rubin | 210/255 |
| 5,310,480 | 5/1994 | Vidueira | 208/313 |

*Primary Examiner*—Robert A. Dawson
*Assistant Examiner*—David Reifsnyder
*Attorney, Agent, or Firm*—Drude Faulconer

[57] ABSTRACT

A method of processing one or more multi-component sidestreams from a separation tower through a hydrocyclone(s) to remove a particular component from the sidestream before returning the remaining components of the stream to the tower for further processing. A sidestream is withdrawn from a first vertical point along a separation tower and is passed through a hydrocyclone which is operated at a split ratio so that the maximum amount of the unwanted component (e.g. water) is removed from the feedstream through the underflow of the hydrocyclone. The remaining components in the feedstream (now substantially free of the unwanted component, flows out the overflow of the hydrocyclone and are passed back into tower through a second vertical point below the withdrawal point to be further processed in the tower. Additional sidestreams can be withdrawn from the tower and processed in the same manner through respective hydrocyclones.

10 Claims, 2 Drawing Sheets

METHOD OF PROCESSING A SIDESTREAM WITH A HYDROCYCLONE

DESCRIPTION

1. Technical Field

The present invention relates to method of processing a sidestream from a separation tower with a hydrocyclone and in one of its aspects relates to a method of processing one or more multi-component sidestreams from a separation tower through a hydrocyclone to remove a particular component from the sidestream before returning the remaining components of the sidestream to the tower for further processing.

2. Background Art

Separation towers which utilize a plurality of coexisting zones which differ from each other in temperature, pressure, composition, and/or phase state are well known in the refining and related industries for separating a feedstream into various products. When a particular feedstream, e.g. produced hydrocarbons, is fed through a separation tower, the molecular composition of each component thereof reacts in a unique way to the differing environments of the various zones of the tower resulting in a separation of the products.

Typically, a separation tower is formed of a plurality of vertically-stacked, horizontal "trays" which form the coexisting zones therebetween. A multi-component feedstream is introduced at one or more vertical points along the column and due to the difference in density between vapor and liquid phases of the stream, the liquid cascades downwardly from tray to tray while vapor flows upwardly through openings in the trays, contacting the liquid on each tray as it flows therethrough.

The liquid which reaches the bottom of the column is partially vaporized in a heated reboiler with the vapor being returned to the tower as stripper vapor while the remaining liquid is withdrawn from the column as "bottoms" or bottom product. The vapor which reaches the top of the column is condensed with a part of the condensed liquid being returned to the column as "reflux" for rectification while the remainder is withdrawn as "distillate", or overhead product.

It is common in separation towers to withdrawn a "sidestream" at one or more vertical points along the column to provide outlet streams in addition to the two end-product streams. The sidestream is routinely processed to separate and remove a particular component, e.g. water, before the remaining components are returned to the column. Presently, the equipment used for processing these sidestreams include gravity separators (e.g. free-water knockout vessels) and/or heater treaters, wash tanks, etc. Such systems routinely rely on heat, chemicals, electrical potentials, and/or long retention times to cause gravity separation of the unwanted component from the other components of the sidestream.

The design and installation of these prior art, sidestream processing systems involve substantial capital outlays and long retention times which seriously affect the overall economics of the separation operation. In addition, the amount and size of such processing equipment normally requires a large "footprint" (large real estate area) and foundation for its installation and operation which is an important consideration in the overall design of most refining, stabilizing, distilling, or like operations, especially for offshore platform facilities where space and weight are critical factors.

Further, where a sidestream which includes hydrocarbons or other potentially explosive components is processed in accordance with known, prior art processes, extreme safety precautions must be maintained at all time in that large volumes or inventories of the explosive-component (e.g. hydrocarbons) must be retained in vessels at high temperature for long periods. Therefore, the possibility of a "BLEVE" (i.e. Boiling Liquid Expanding Vapor Explosion) is always present during the separation operation.

DISCLOSURE OF THE INVENTION

The present invention provides a method of processing one or more multi-component sidestreams from a separation tower through a hydrocyclone(s) to remove a particular component from the sidestream before returning the remaining components of the sidestream to the tower for further processing. In accordance with the present invention, the processing time and the amount of equipment and operating expense are significantly reduced in processing the sidestreams in that the present invention utilizes a single stage hydrocyclone to separate the particular component during a single pass through the hydrocyclone. Further, since the use of a hydrocyclone eliminates the need for any large inventories of the sidestream or any of its components during processing, safety involved in processing the sidestream is significantly enhanced.

More specifically, a sidestream is withdrawn at a vertical point along a separation tower (e.g. a deethanizer) which, in turn, is comprised of a plurality of trays which are stacked and spaced vertically within cylindrical shell. A multi-component feed stream (e.g. $C_1$ to $C_{50}$[30] hydrocarbons, water, asphaltenes, etc.) is fed into tower wherein the liquid components of the feedstream cascades downward from tray to tray while the vapor components pass upward in the tower. The liquid product which reaches the bottom of the tower and is removed as "bottoms" or bottom product. The vapor which reaches the top of the column is withdrawn as "distillate" or overhead product.

In accordance with the present invention a first sidestream is withdrawn from a first vertical point along the separation tower wherein the prior-art, relatively expensive, processing system, described above, has been effectively replaced by a simple, economical, hydrocyclone(s). The feedstream is withdrawn and passed through the hydrocyclone which is operated at a split ratio so that the maximum amount of the unwanted component (e.g. water) is removed from the feedstream through the underflow of the hydrocyclone.

The remaining components in the feedstream (now substantially free of the unwanted component, e.g. water) exit hydrocyclone as the overflow and are passed back into tower through a second vertical point, which lies below the withdrawal point, to be separated into the overhead and bottom products. In some separation tower operations, there may be more that one unwanted component in a multi-component feedstream. In these instances, a second sidestream is withdrawn from another vertical point along the tower and is passed through a second hydrocyclone.

The second hydrocyclone is operated at a split ratio to remove the maximum amount of the second unwanted component (e.g. asphaltenes) from the feedstream through the underflow of the hydrocyclone.

The remaining components in the feed stream (now substantially free of the second unwanted component) exit hydrocyclone as the overflow and are passed back into tower through still another vertical point, which lies below the withdrawal point of the second sidestream, where the returned components are further separated into the overhead and bottom products. Depending on the pressures in the tower at the withdrawal and reentry points, external pumps may have to be used for circulating the feedstream to and/or from the respective hydrocyclones, if needed. If additional sidestreams are withdrawn from the separation tower, each is processed with a respective hydrocyclone in the same manner as described above.

BRIEF DESCRIPTION OF THE DRAWINGS

The actual construction, operation, and apparent advantages of the present invention will be better understood by referring to the drawings in which like numerals identify like parts and in which.

BEST KNOWN MODE FOR CARRYING OUT THE INVENTION

Figure 1:
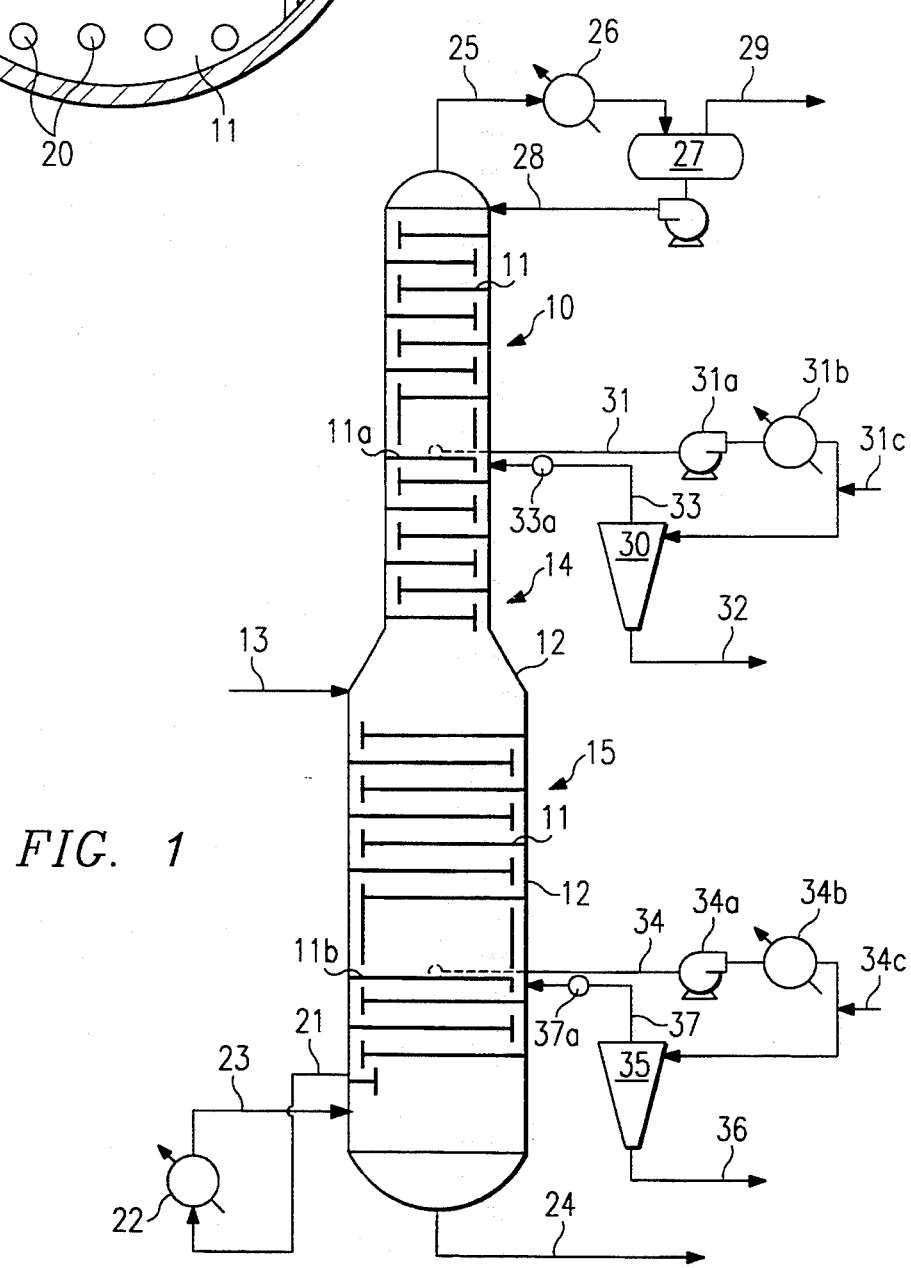
FIG. 1 is a schematical flow diagram of a typical separation tower having a plurality; of sidestream withdrawals which are processed in accordance with the present invention.

Referring more particularly to the drawings, separation tower 10 in FIG. 1 is representative of known towers and/or columns which utilizes a plurality of coexisting zones to separate the components of a feed stream. Accordingly, the term "separation tower(s)", as used throughout the specification and claims, is generic and is intended to include all such towers and/or columns, e.g. stablization columns, distillation towers, strippers, splitters, refinery crude stills, pipe stills, natural gas fractionators, de-methanizers, de-ethanizers, de-propanizers, etc.. While the basic construction and the operation of this general type of separation tower is universally known, a brief description of a typical separation tower and its operation will be set forth in order to better understand the present invention.

Typically, a "separation tower" is formed of a plurality of trays, pans, plates, packings, etc. (hereinafter referred to as "trays") which are vertically spaced and stacked one above the other within a cylindrical shell to form a vertical column. Coexisting zones, which differ from each other in temperature, pressure, composition, liquid/vapor traffic rates, and/or phase state, are formed between respective adjacent trays within the tower. The "feedstream" (i.e. the material to be separated) is fed into separation tower at one or more vertical points along the tower and, due to the difference in gravity between vapor and liquid phases of the stream, the liquid cascades downward from tray to tray while the vapor flows upward through openings in the trays, contacting the liquid on each tray as it flows therethrough.

The "lighter" (low-boiling) components tend to concentrate in the vapor phase while the heavier (higher-boiling) components tend toward the liquid phase. The result is a vapor phase that becomes richer in light components as it passes upward and a liquid phase that becomes richer in heavy components as it cascades downward through the column. The overall separation achieved between the overhead product and the bottom product depends upon well known engineering principles involved in the design of the tower, e.g. the relative volatilities of the components, the number of trays, and the ratio of the liquid-phase/vapor-phase flow rates in the column, etc..

The liquid product which reaches the bottom of the column is partially vaporized in a heated reboiler with the vapor being sent back upward through the tower while the remaining liquid is withdrawn from the column as "bottoms" or bottom product. The vapor which reaches the top of the column is cooled and condensed in an overhead condenser with part of the liquid being returned to the column as "reflux" while the remainder of the overhead stream is withdrawn as "distillate" or overhead product.

In separation towers of this type, it is not uncommon to withdrawn a "sidestream" at one or more vertical points along the column and process the stream externally to the column to remove some particular component(s) from the sidestream before the remaining components are returned to the column for further processing. Often this component(s) (e.g. water) is one which is detrimental to both the overhead and the bottom product or might be one (e.g. asphaltenes) which may seriously interfer with the efficient separation of the overhead and bottom products within the tower.

In processing these sidestreams, there may be a partial or total withdrawal of the feedstream from a designated tray or "pan" within the tower. Heretofore, the processing of these sidestreams have required substantial amounts of equipment (e.g. gravity separator such as free-water knockout vessels, heater treaters, wash tanks, and the like) which routinely rely on heat, chemicals, electrical potentials, and/or long retention times to separate the unwanted component from the sidestream. As will be recognized by those skilled in this art, the design and installation of such sidestream processing systems require substantial capital outlays which substantially add to the start-up costs of the separation tower.

In addition to the cost of the required equipment, the long retention times, which are normally required to effectively separate the unwanted component, add further to the operating costs of the separation tower. Further, due to the size and nature of the equipment involved, a large area of real estate (i.e. "footprint") is required for installation of the tower and the sidestream processing system which is no small consideration in the designing a separation tower operation, especially on offshore platforms where space and weight are at a premium. Still further, as mentioned above, maintaining the large inventories of potentially-explosive components required in processing the sidestream(s) present serious safety hazards which must be taken into account in any such operation. As will become evident from the following description, the present invention substantially reduces the time and the cost and amount of the equipment required for processing a sidestream(s) from a separation tower and significantly improves the safety of such operations.

Figure 3:
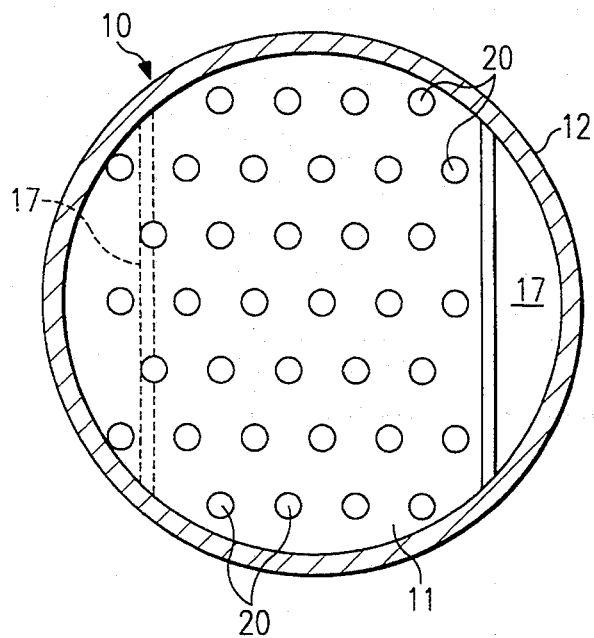
FIG. 3 is an enlarged, sectional view taken along line 3—3 of FIG. 1.
Figure 2:
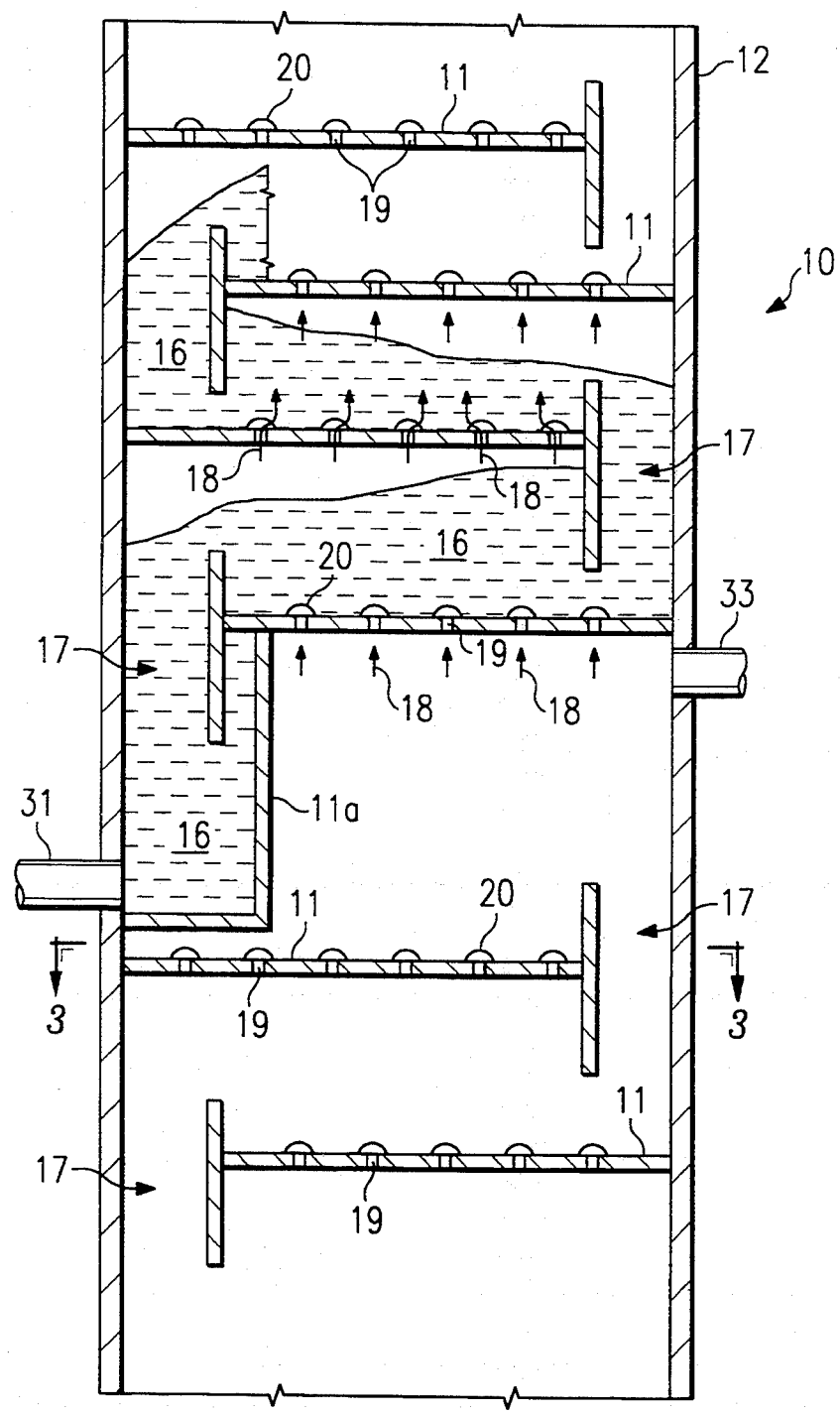
FIG. 2 is a partial sectional view of a typical single-pass, separation tower showing a total draw pan or tray.

Referring now to FIGS. 1-4, separation tower 10 (e.g. a deethanizer) is comprised of a plurality of trays 11 (only a few numbered for the sake of clarity) which are stacked and spaced vertically within cylindrical shell 12. A multi-component feed stream (e.g. $C_1$ to $C_{50}{}^+$ hydrocarbons, water, asphaltenes, etc.) is fed into tower 10 through an inlet 13 at a point which effectively divides tower 10 into an upper or rectifying section 14 and a lower or stripping section 15. As best seen in FIGS. 2 and 3, the liquid components 16 of the feed stream will cascade downward from tray to tray through "downcomers 17" while the vapor components (arrows 18) will pass upward through openings 19 in each tray 11 having contacting units (e.g. "bubble caps" 20, valves, sieves, or the like) thereon.

The liquid product which reaches the bottom of column 10 is removed through line 21 and is partially vaporized in a heated reboiler 22 with the vapor being sent back to column 10 through line 23. The remaining liquid is withdrawn from the column through outlet 24 as "bottoms" or bottom product. The vapor which reaches the top of the column is withdrawn through line 25, cooler 26, and is condensed in an overhead condenser 27 with part of the liquid being returned to the column through line 28 as "reflux" while the remainder of the overhead stream is withdrawn through line 29 as "distillate" or overhead product. The description of tower 10 and its operation to this point are well known in the art.

In accordance with the present invention, a first sidestream is withdrawn from a first point (tray 11a) wherein the prior-art, relatively expensive, processing system, described above, has been effectively replaced by simple, economical hydrocylone 30. While only one hydrocyclone is illustrated for processing a particular sidestream in FIG. 1 and will be referred to only in the singular, it should be recognized that each illustrated hydrocyclone may, in fact, actually represent a plurality of small hydrocyclones connected for parallel and/or serial flow at that location depending on the volume of flow to be processed and the force level and number of hydrocyclones in series required to effect the desired separation of the feed stream.

A first sidestream from tray 11a is withdrawn through line 31 and is passed via pump 31a through hydrocyclone 30 which is operated at a split ratio to remove the maximum amount of the unwanted component (e.g. water) from the sidestream through the underflow 32 of the hydrocyclone. This "underflow" (e.g. water) may still contain small amounts of the other components of the feedstream depending on the actual split ratio of the hydrocyclone but is insignificant in the overall separation process and may be further processed or disposed of as the situation dictates. Also, the sidestream may be passed through a heat exchanger 31b to heat or cool the sidestream to alter its characteristics in a manner which enhances the separation in hydrocyclone 30. Still further, a treating fluid (e.g. emulsion breakers, water, etc.) may also be added through inlet 31c) to likewise favorably alter the characteristics of the sidestream before it is passed through the hydrocyclone.

The remaining components in the sidestream (now substantially free of the unwanted component, e.g. water) exit hydrocyclone 30 as the overflow 33 and are passed back into tower 10 through a second vertical point (i.e. the tray below tray 11a) where they are further separated into overhead and bottom products. If the components have been substantially cooled, they may be passed through heat exchanger 33a to bring them back up to tower temperature at the reentry point.

In some separation tower operations, there may be more that one unwanted component in a multi-component feedstream. For example, in addition to unwanted water, a hydrocarbon feedstream may also contain asphaltenes which react in the presence of light hydrocarbons (e.g. $C_2$–$C_5$) to form sludges or the like. Since at some point in the tower, propane will exist in substantial amounts, it is desirable, if not necessary, to remove the asphaltenes from the sidestream to prevent serious problems in tower 10. Accordingly, a second sidestream is withdrawn from another or third vertical point (e.g. tray 11b) along tower 10 through line 34 and is passed via pump 34a through a second hydrocyclone 35. Second sidestream may be passed through optional heat exchanger 34b and treating fluid may be added through inlet 34c for favorably altering the characteristics of the sidestream similarly as discussed above.

Hydrocyclone 35 is operated at a split ratio to remove the maximum amount of the unwanted component(s) (e.g. asphaltenes) from the second sidestream through the underflow 36 of the hydrocyclone. Again, the underflow (e.g. asphaltenes) may contain small, insignificant amounts of the other components of the sidestream depending on the actual split ratio of the hydrocyclone and may be further processed or disposed of as the situation dictates.

The remaining components in the second sidestream (now substantially free of the unwanted component(s), e.g. asphaltenes) exit hydrocyclone 33 as the overflow 37 and are passed back into tower 10 through a fourth vertical point, i.e. the tray below tray 11b, where the returned components are further separated into overhead and bottom products. Depending on the pressures in the tower at the withdrawal and reentry points, respective pumps 31a, 34a are normally needed for circulating the sidestream to and/or from hydrocyclones 30, 35. Of course, additional pumps located at the appropriate locations can be used, if needed. Any additional sidestreams (not shown) which are withdrawn from the separation tower will be processed with a respective hydrocyclone in the manner described above.

What is claimed is:

1. A method of processing a multi-component stream from a separation tower which is comprised of a vertical column having a plurality of vertically-stacked, horizontal trays therein which form coexisting zones therebetween wherein said stream includes an unwanted component, said method comprising:

withdrawing said multi-component sidestream including said unwanted component from one of said coexisting zones at a first vertical point along said separation tower;

passing said multi-component sidestream including component through a hydrocyclone to substantially separate said unwanted component from said multi-component sidestream; and passing the components remaining in said multi-component sidestream without further separation back into a different one of said coexisting zones of said separation tower at a second vertical point along said separation tower.

2. The method of claim 1 including:

withdrawing a second multi-component sidestream including a second unwanted component from another one of said coexisting zones at a third vertical point along said separation tower;

passing said second multi-component sidestream including said second unwanted component through a second hydrocyclone to substantially separate said unwanted component from said second multi-component sidestream; and passing the components remaining in said second multi-component sidestream back without further separation into a still different one of said coexisting zones in said separation tower at a fourth vertical point along said separation tower.

3. The method of claim 2 wherein said second vertical point lies below said first vertical point along said separation tower.

4. The method of claim 3 wherein said fourth vertical point lies below said third vertical point along said separation tower.

5. The method of claim 2 wherein said separated one component of said second multi-component sidestream is removed through the underflow of said second hydrocyclone and the remaining components of said second multi-component sidestream is removed through the overflow of said second hydrocyclone.

6. The method of claim 1 including:
heating said sidestream before passing it through said hydrocyclone.

7. In a method of separating a multi-component feedstream into an overhead product and an bottom product in a separation tower which is comprised of a vertical column having a plurality of vertically-stacked, horizontal tray therein which form coexisting zones therebetween wherein said overhead product is withdrawn from the top of the separation tower and the bottom product is withdrawn from the bottom of the separation tower, the improvement comprising:

withdrawing said multi-component sidestream which includes an unwanted component from one of said coexisting zones at a first vertical point along said separation tower;

passing said multi-component sidestream including said unwanted component through a hydrocyclone to substantially separate said unwanted component from said multi-component sidestream;

passing the components remaining in said multi-component sidestream from said hydrocyclone without further separation back into a different one of said coexisting zones of said separation tower at a second vertical point along said separation tower.

8. The method of claim 7 wherein the improvement further comprises:
operating said hydrocyclone at a split ratio whereby said separated one component is removed through the underflow of said hydrocyclone and the remaining components of said multi-component sidestream is removed through the overflow of said hydrocyclone.

9. The method of claim 8 wherein the improvement further comprises:
withdrawing a second multi-component sidestream including a second unwanted component from another one of said coexisting zones at a third vertical point along said separation tower;

passing said second multi-component sidestream including said second unwanted component through a second hydrocyclone to substantially separate said unwanted component from said second multi-component sidestream; and passing the components remaining in said second multi-component sidestream back without further separation into a still different one of said coexisting zones in said separation tower at a fourth vertical point along said separation tower.

10. The method of claim 9 wherein the improvement further comprises:
operating said second hydrocyclone at a split ratio whereby said separated one component from said second multi-component sidestream is removed through the underflow of said second hydrocyclone and the remaining components of said multi-component sidestream is removed through the overflow of said second hydrocyclone.

* * * * *